(12) United States Patent
Miyazaki et al.

(10) Patent No.: US 10,768,801 B2
(45) Date of Patent: Sep. 8, 2020

(54) ELECTRONIC DEVICE AND METHOD FOR DISPLAYING CONTENTS

(71) Applicant: TOSHIBA TEC KABUSHIKI KAISHA, Shinagawa-ku, Tokyo (JP)

(72) Inventors: Sou Miyazaki, Tokyo (JP); Masaki Narahashi, Tokyo (JP); Hiroyo Tanaka, Tokyo (JP); Tatsuya Inagi, Izu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/033,797

(22) Filed: Jul. 12, 2018

(65) Prior Publication Data

US 2019/0079652 A1 Mar. 14, 2019

(30) Foreign Application Priority Data

Sep. 8, 2017 (JP) ................. 2017-173000

(51) Int. Cl.
*G06F 3/0485* (2013.01)
*G06F 3/01* (2006.01)
*G06F 3/0484* (2013.01)
*G06F 3/0488* (2013.01)

(52) U.S. Cl.
CPC ............ *G06F 3/0485* (2013.01); *G06F 3/017* (2013.01); *G06F 3/04842* (2013.01); *G06F 3/04883* (2013.01)

(58) Field of Classification Search
CPC .... G06F 3/0485; G06F 3/017; G06F 3/04842; G06F 3/04883

USPC .......................................................... 715/767
See application file for complete search history.

(56) References Cited

U.S. PATENT DOCUMENTS

| | | | |
|---|---|---|---|
| 8,812,989 B1* | 8/2014 | Liutikas | G06F 3/0488 715/838 |
| 2014/0026097 A1* | 1/2014 | Crohas | G06F 3/04883 715/810 |
| 2015/0160732 A1 | 6/2015 | Sugiyama et al. | |

FOREIGN PATENT DOCUMENTS

JP 2012-208636 A 10/2012

OTHER PUBLICATIONS

Search Report dated Dec. 21, 2018 received in corresponding European application No. 18 18 9975.8, 9 pages.
U.S. Appl. No. 15/717,469, filed Sep. 27, 2017, Tatsuya Inagi.

\* cited by examiner

*Primary Examiner* — Andrey Belousov
(74) *Attorney, Agent, or Firm* — Foley & Lardner LLP

(57) ABSTRACT

An electronic device includes a display module configured to display contents in which a second area for displaying a second content is nested in a first area for displaying a first content. A focus setting module is configured to set a focus on the first content or the second content according to a predetermined gesture operation. A scrolling module is configured to scroll the first content or the second content on which the focus is set according to the predetermined scrolling operation regardless of whether the scrolling operation target is the first area or the second area.

16 Claims, 7 Drawing Sheets

ELECTRONIC DEVICE AND METHOD FOR DISPLAYING CONTENTS

CROSS-REFERENCE TO RELATED APPLICATION

This application is based upon and claims the benefit of priority from Japanese Patent Application No. 2017-173000, filed Sep. 8, 2017, the entire contents of which are incorporated herein by reference.

FIELD

Embodiments described herein relate generally to an electronic device and a method for displaying contents.

BACKGROUND

In recent years, it has become popular to control an operation of a device by performing a so-called "gesture", i.e., performing a specific input operation (touch method) with a finger or a dedicated pen on a touch panel, or performing input through shaking or tilting a main body of the device and then enabling a sensor arranged in the device to react.

For example, in a smartphone provided with a touch panel, if the entire contents cannot be displayed in one screen, it is possible to scroll contents displayed in the screen by a gesture called a swipe or flick to change a range to be displayed of the contents.

In scrollable contents (referred to as a scroll view in some cases), for example, another content (child content) that can be vertically scrolled is nested in a vertically scrollable content (parent content). Scrolling by a gesture is performed on contents displayed in an area subjected to a gesture operation. Therefore, if the gesture operation is performed on the child content, the child content is scrolled. On the other hand, if the gesture operation is performed on the parent content, the entire parent content including the child content is scrolled. Therefore, it is necessary to perform the gesture operation on an area where contents to be scrolled are displayed, depending on which of the parent content and child content is scrolled.

However, as the child content is set in most of the area of the parent content due to the design of the contents, there is a case in which an area of the parent content other than the child content is narrowed. In such a case, it is difficult to perform a gesture operation for scrolling the parent content. On the other hand, if the area of the child content is extremely narrow, it becomes difficult to perform a gesture operation for the child content.

In the case of contents in which another contents are nested, if the child content is scrolled upward (or downward) to reach the bottom (or top) by the gesture operation on the child content, it is possible to scroll the parent content upward (or downward). However, in a case of trying to scroll the parent content through the gesture operation on the child content, the child content must be scrolled to the bottom or the top. Therefore, if the area of the child content is large, it is necessary to repeat the gesture operation on the child content to scroll the child content to the bottom or the top, leading to large operation burden.

DETAILED DESCRIPTION

In accordance with some embodiments, an electronic device comprises a display module configured to display contents in which a second area for displaying a second content is nested in a first area for displaying a first content; a focus setting module configured to set a focus on the first content or the second content according to a predetermined gesture operation; and a scrolling module configured to scroll the first content or the second content on which the focus is set according to the predetermined gesture operation regardless of whether a scrolling operation target is the first area or the second area.

Hereinafter, embodiments will be described with reference to the accompanying drawings.

Figure 1:
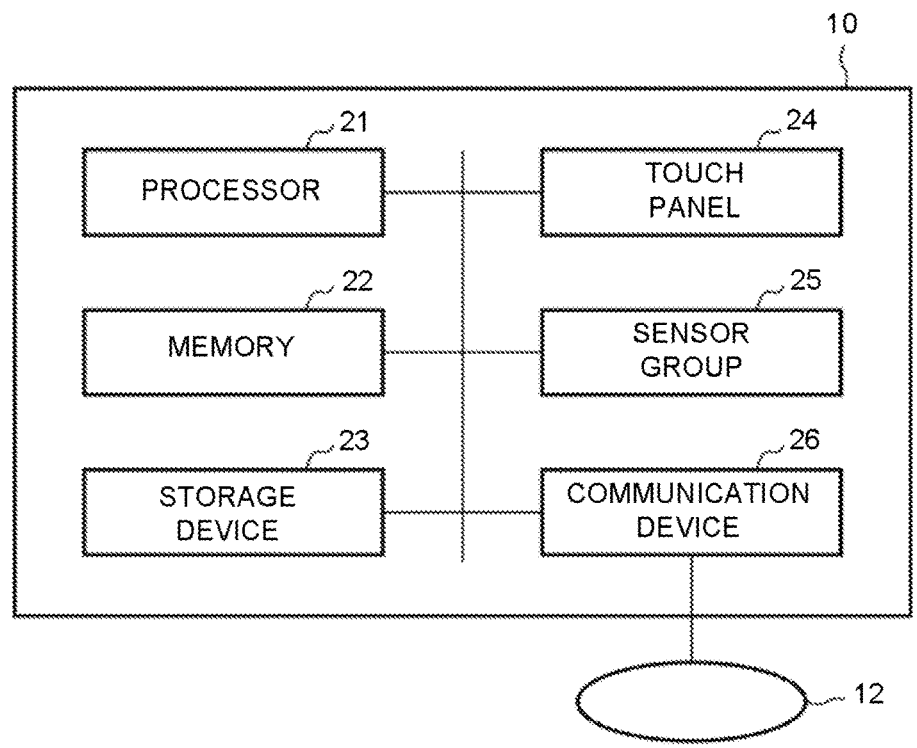
FIG. 1 is a block diagram illustrating an arrangement of an electronic device according to some embodiments.

FIG. 1 is a block diagram illustrating an arrangement of an electronic device 10 according to some embodiments. For example, the electronic device 10 may be a smartphone, a mobile phone, a personal computer (tablet type, notebook type, desktop type), a navigation device, a portable game device, a POS (Point Of Sales) terminal, a digital MFP (Multi-Function Peripheral) and the like. In the following description, it is assumed that the electronic device 10 is a smart phone. The electronic device 10 can display the contents on the screen based on data stored in a storage device installed therein or data (such as Web content) received via a network 12 such as Internet and the like.

The electronic device 10 of some embodiments provides, for example, an operation method of contents (scroll view) to facilitate a scrolling operation on the contents in which another content (child content (second content)) that can be vertically scrolled is nested in a vertically scrollable content (parent content (first content)). A scrolling direction is not limited to a vertical direction, for example, it may be a horizontal direction.

As shown in FIG. 1, the electronic device 10 comprises a processor 21, a memory 22, a storage device 23, a touch panel 24, a sensor group 25, a communication device 26, which are connected to each other via a bus.

The processor 21 controls the entire electronic device 10 by executing programs stored in the memory 22. The programs executed by the processor 21 include an OS (Operating System) and various application programs. The application programs may include, for example, a program for displaying contents such as a browser program.

The memory 22 may include, for example, a ROM (Read Only Memory) and a RAM (Random Access Memory), and stores programs executed by the processor 21 and various data. The program for displaying contents stored in the memory 22 is executed by the processor 21 to display the contents on the touch panel 24. The contents displayed on the touch panel 24 include Web contents described in HTML (Hypertext Transfer Protocol), XHTML (eXtensible HyperText Markup Language), or the like. The contents in other data formats may also be set as a target.

The storage device 23 stores a hard disk program and various data.

The touch panel 24 includes a display device such as a liquid crystal display (LED (Light Emitting Diode)), and an input device such as a touch sensor mounted on a display surface of the display device. The display device mounted in the touch panel 24 may be another display such as an organic EL (Electro-Luminescence) display. The input device mounted in the touch panel 24 is not limited to the touch sensor, and other types such as a capacitive type, an optical type, an electromagnetic induction type, etc. may be used. It is assumed that the input device of the touch panel 24 is provided with a touch sensor capable of sensing a so-called multi-touch, for example, capable of detecting a touch operation on a plurality of positions at the same time. Embodiments are not limited to a touch sensor capable of sensing multi-touch.

The sensor group 25 includes a plurality of sensors for detecting a situation of the electronic device 10. For example, the sensor group 25 includes a touch sensor for detecting touch on a main body of the electronic device 10, a three-axis acceleration sensor for detecting a change (movement and posture) in the posture of the main body of the electronic device 10, and the like.

Under the control of the processor 21, the communication device 26 communicates with an external device via the network 12.

The processor 21 can recognize a type and a position of the gesture operation performed on the touch panel 24 by detecting an input operation by a fingertip or a pen on the operation surface of the touch panel 24. The processor 21 can recognize, as the gesture operation on the touch panel 24, a touch and hold gesture (long press), a swipe gesture (tracing with one finger or a pen), a press (strong press), a double-finger double tap (tap two places twice at the same time), etc.

Further, the processor 21 can recognize the gesture operation for changing the posture of the main body of the electronic device 10 based on a measured value by the three-axis acceleration sensor of the sensor group 25. For example, the processor 21 can recognize, for example, a shake operation (shaking the main body of the device) as the gesture operation for changing the posture of the main body of the device to switch focused contents described later. As the shake operation, for example, in addition to an operation through which any direction and orientation at the time of shaking the main body of the device is possible, an operation of shaking one end (for example, an upper end) of the main body of the device towards a backward direction, and an operation of shaking the other end (for example, a lower end) of the main body of the device towards a forward direction can be recognized. In addition to the shake operation, other gesture operations for changing the posture of the main body of the electronic device 10 which can be detected by the sensor group 25 may be recognized.

In the electronic device 10 according to some embodiments, any gesture operation recognizable by the processor 21 is set in advance as a gesture operation for switching the focused content.

Figure 2:
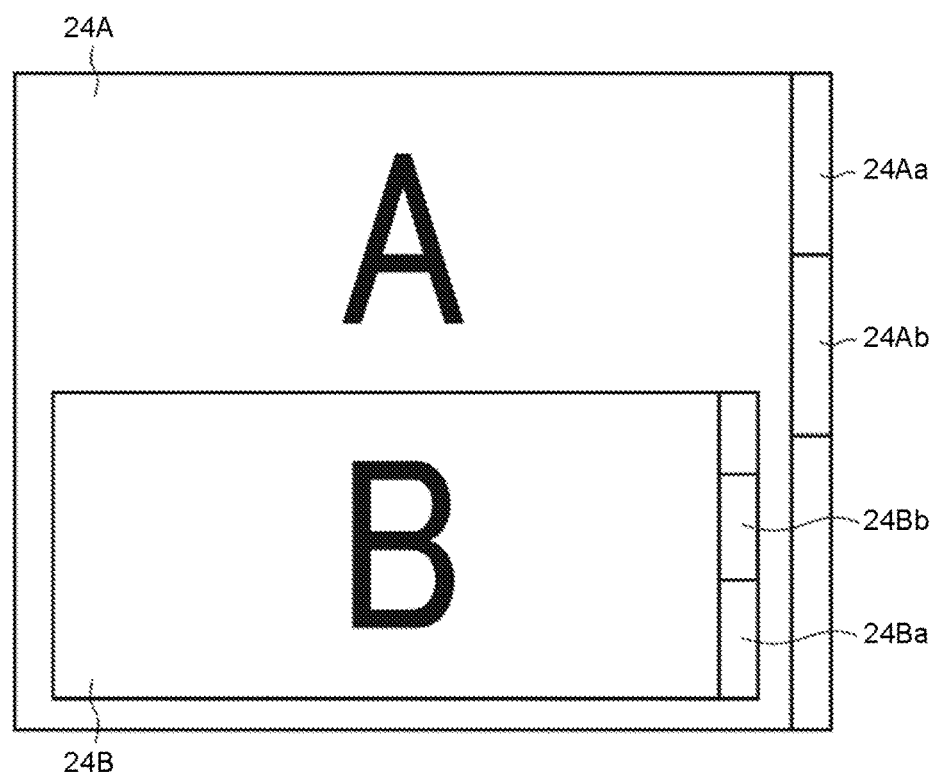
FIG. 2 is a diagram illustrating an example of contents displayed on a touch panel 24 of the electronic device according to some embodiments.

FIG. 2 is a diagram illustrating an example of contents displayed on the touch panel 24 of the electronic device 10 according to some embodiments.

A content 24A (referred to as a scroll view in some cases) shown in FIG. 2 can be scrolled in the vertical direction. A scroll bar 24Aa is provided on the right lateral side of an area for displaying the content 24A. By moving a slider 24Ab of the scroll bar 24Aa in the vertical direction, it is possible to scroll the content 24A in the vertical direction. A content 24B is displayed in an area nested in the area for displaying the content 24A. A scroll bar 24Ba is provided on the right lateral side of the area for displaying the content 24B. By moving a slider 24Bb of the scroll bar 24Ba in the vertical direction, it is possible to scroll the content 24B in the vertical direction.

The content 24A and the content 24B have parent-child relationship, the content 24A is equivalent to the parent content, and the content 24B is equivalent to the child content. Focus can be set on both the content 24A and the content 24B, and the content on which the focus is set becomes a scrolling target according to the scrolling operation. By default, the focus is set on the content 24A, and the focus is not simultaneously set on both the content 24A and the content 24B. The processor 21 displays the content on which focus is set by coloring an area frame with a specific color so as to easily determine the focused content visually.

Next, a control process of the operation method of the contents (scroll view) by the electronic device 10 according to some embodiments are described.

Figure 3:
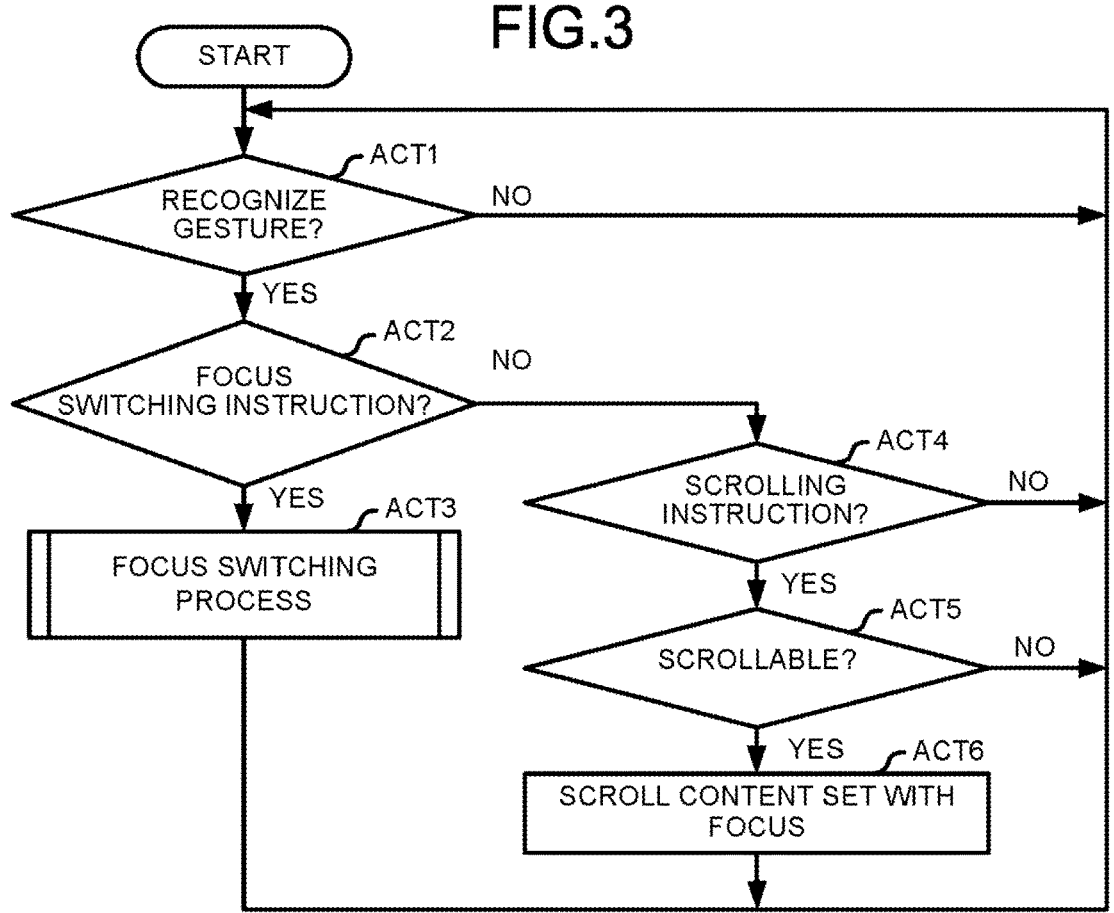
FIG. 3 is a flowchart illustrating a gesture operation process according to some embodiments.

First, the gesture operation process in some embodiments is described with reference to a flowchart shown in FIG. 3.

The processor 21 recognizes whether an input operation on the touch panel 24 or an operation for changing the posture of the main body of the device detected by the sensor group 25 is a gesture operation. If the foregoing operation is not the gesture operation (No in ACT 1), the processor 21 does not execute a process corresponding to the operation. On the other hand, if the operation is the gesture operation (Yes in ACT 1), the processor 21 determines whether the gesture operation is a predetermined gesture operation for switching the focus.

If the recognized gesture operation is an instruction to switch the focus (Yes in ACT 2), the processor 21 executes a focus switching process (ACT 3). In the focus switching process, the focus is set on the content 24A or the content 24B according to the content on which the current focus is set and a content of the gesture operation. Details of the focus switching process are described later.

On the other hand, if the gesture operation is not the focus switching instruction (No in ACT 2), the processor 21 determines whether it is a scrolling operation for instructing scrolling of the content.

Here, if it is determined that the operation is not a scrolling operation for instructing the scrolling (No in ACT 4), the processor 21 determines the operation as an input operation for another process other than the scrolling, and executes another process in response to the input operation.

On the other hand, if it is determined that the operation is the scrolling operation for instructing the scrolling (Yes in ACT 4), the processor 21 scrolls the content in response to the scrolling operation (ACT 6) if the content on which the current focus is set is scrollable (Yes in ACT 5).

For example, in a case in which the focus is set on the content 24B, if the content 24B is beyond the display range, it is determined that scrolling is not possible. If a scrolling operation for further scrolling the content on which the focus is set upward (or downward) is input while the content is scrolled to the top (or bottom), it is determined that scrolling is not possible.

Here, as the scrolling operation, for example, a vertical swipe gesture (operation to trace the operation surface of the touch panel 24 vertically with one finger or a pen) is used. The processor 21 scrolls the content on which the focus is set in response to an operation amount of the vertical swipe gesture.

In the electronic device 10 of some embodiments, regardless of whether the target of the vertical swipe gesture operation is the area for displaying the content 24A or the area for displaying the content 24B, the content on which the focus is set is scrolled through the predetermined scrolling operation (vertical swipe gesture). In other words, there is no need to perform the vertical swipe gesture operation on the area for displaying the content to be scrolled. There is also no need to change the gesture operation for scrolling.

Therefore, since the content 24B is set in most of the area for displaying the content 24A shown in FIG. 2, even if the area for displaying the content 24A other than the content 24B is narrow and it is difficult to a gesture operation for scrolling on the area for displaying the content 24A, the content 24A can be scrolled by performing an operation on the area for displaying the content 24B. Even if the area for displaying the content 24B is extremely narrow and it is difficult to perform the gesture operation for scrolling on the area for displaying the content. 24B, the content 24B can be scrolled by an operation on the area for displaying the content 24A.

The focus switching process in a case in which the gesture operation for switching the focus is an input operation on the touch panel 24, and the focus switching process in a case in which the gesture operation for switching the focus is the operation for changing the posture of the main body of the device detected by the sensor group 25 are described below.

Figure 4:
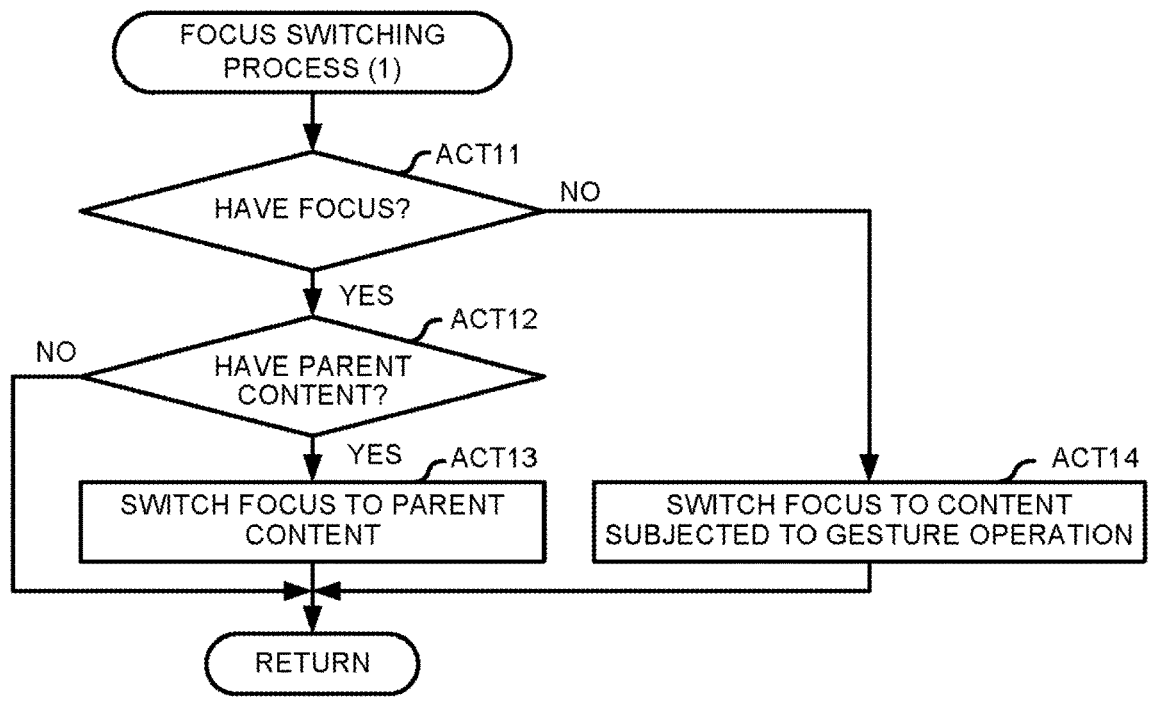
FIG. 4 is a flowchart illustrating a focus switching process (1) according to some embodiments.
Figure 5:
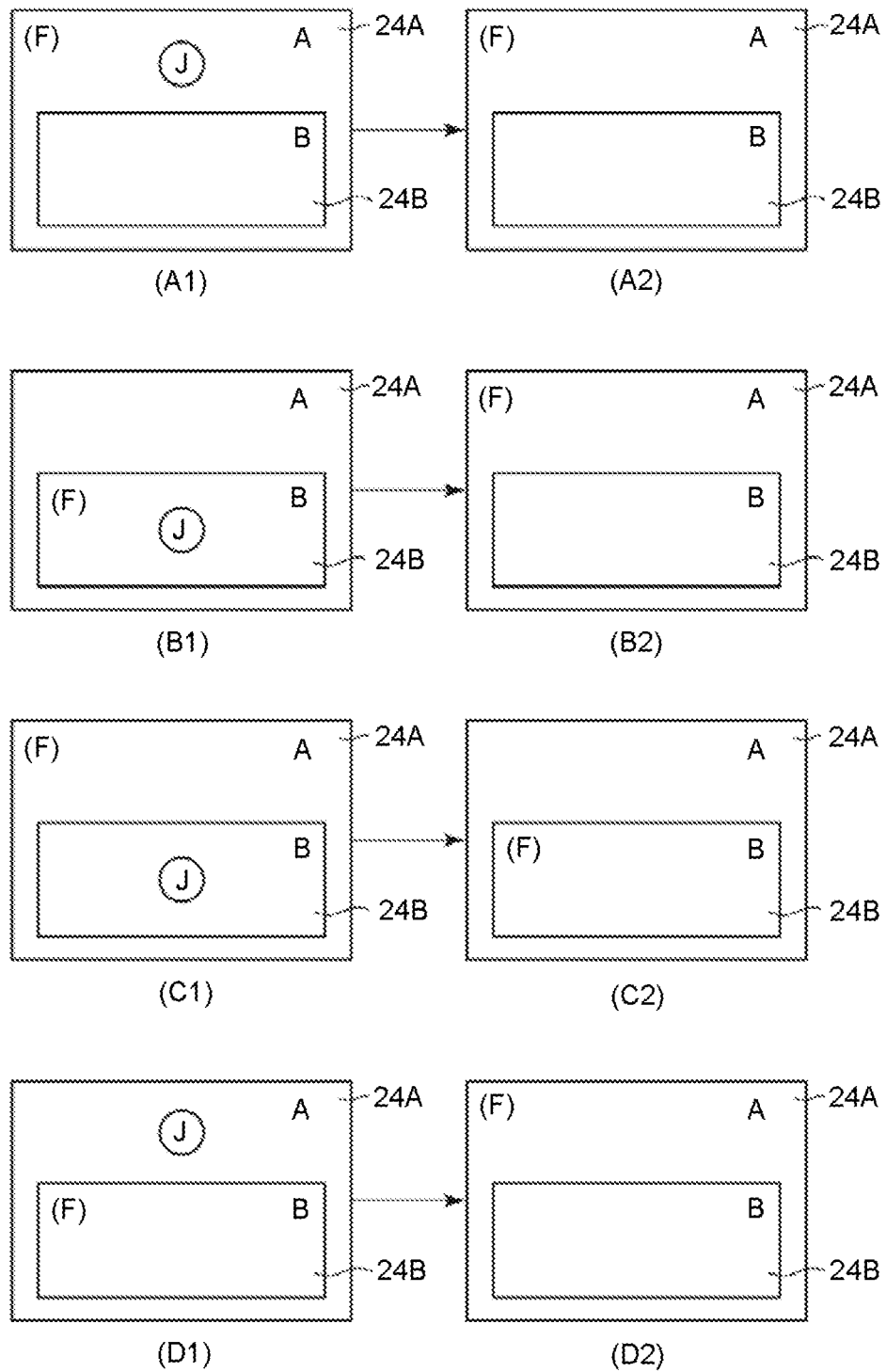
FIG. 5 is a diagram for explaining the focus switching process (1)

First, the focus switching process (1) in a case in which the gesture operation for switching the focus is an input operation on the touch panel 24 is described with reference to a flowchart shown in FIG. 4. FIG. 5 is a diagram for explaining the focus switching process (1).

For example, if a predetermined touch and hold gesture (long press), is detected as the gesture operation for switching the focus, the processor 21 searches for the content displayed in an area where the gesture operation is performed. Here, if the focus is set for the content displayed in an area in which the gesture operation is performed (Yes in ACT 11), the processor 21 searches for the parent content of this content.

If there is no parent content (No in ACT 12), the processor 21 does not switch the focus. On the other hand, if there is the parent content (Yes in ACT 12), the processor 21 switches the focus to the parent content (ACT 13).

As shown in FIG. 5 (A1), if the gesture operation for switching the focus is performed on the area for displaying the content 24A on which the focus (F) is set (J), the focus can be continuously set on the content 24A without switching the focus, as shown in FIG. 5(A2).

On the other hand, as shown in FIG. 5(B1), if the gesture operation for switching the focus is performed on the area for displaying the content 24B where the focus (F) is set (J), the focus is switched to the content 24A which is the parent content, as shown in FIG. 5(B2). During browsing while scrolling the content displayed as the content 24B, by performing the focus switching operation on the area for displaying the content 24B, the focus can be switched to the content 24A. As described above, the processor 21 scrolls the content on which the focus is set, regardless of which area for displaying the content the scrolling operation is performed on. Therefore, after the focus is switched by performing the operation on the area for displaying the content 24B, the content 24A can be scrolled through the scrolling operation on the area for displaying the content 24B. The content 24A can naturally be scrolled as well by the scrolling operation on the area for displaying the content 24A.

If the focus is not set on the content displayed in the area where the gesture operation for switching the focus is performed (No in ACT 11), the processor 21 switches the focus to the content subjected to the gesture operation (ACT 14).

Specifically, as shown in FIG. 5(C1), if the gesture operation for switching the focus is performed on the area for displaying the content 24B on which the focus (F) is not set (J), the focus is switched to the content 24B, as shown in FIG. 5(C2). As shown in FIG. 5(D1), if the gesture operation for switching the focus is performed on the area for displaying the content 24A on which focus (F) is not set (J), the focus is switched to the content 24A, as shown in FIG. 5(D1). By performing the focus switching gesture operation on the area for displaying the content on which the focus is not set, it is possible to switch the focus to the content which is the target of the gesture operation.

In the above description, the touch and hold gesture (long press) is described as an example of the gesture operation for switching the focus on the touch panel 24; however, other gesture operations such as the press (strong press), the double-finger double tap (tap two places twice at the same time), and the like may be used.

Figure 6:
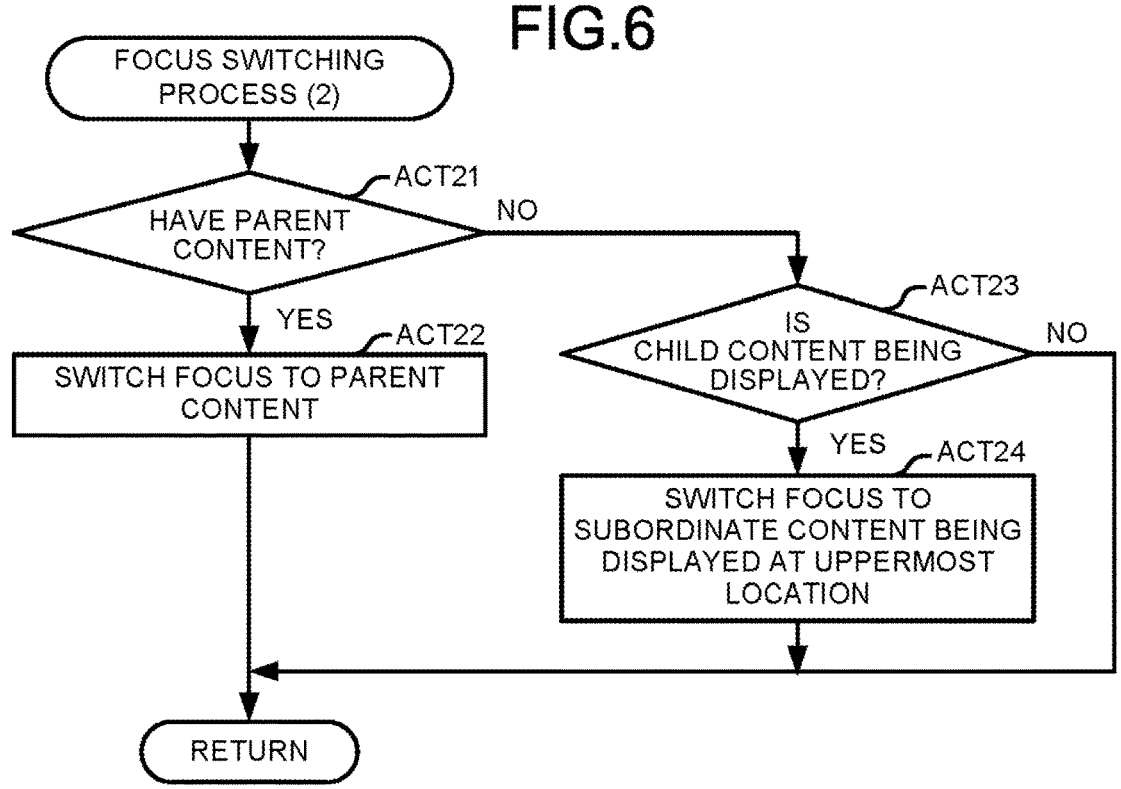
FIG. 6 is a flowchart illustrating a focus switching process (2) according to some embodiments.
Figure 7:
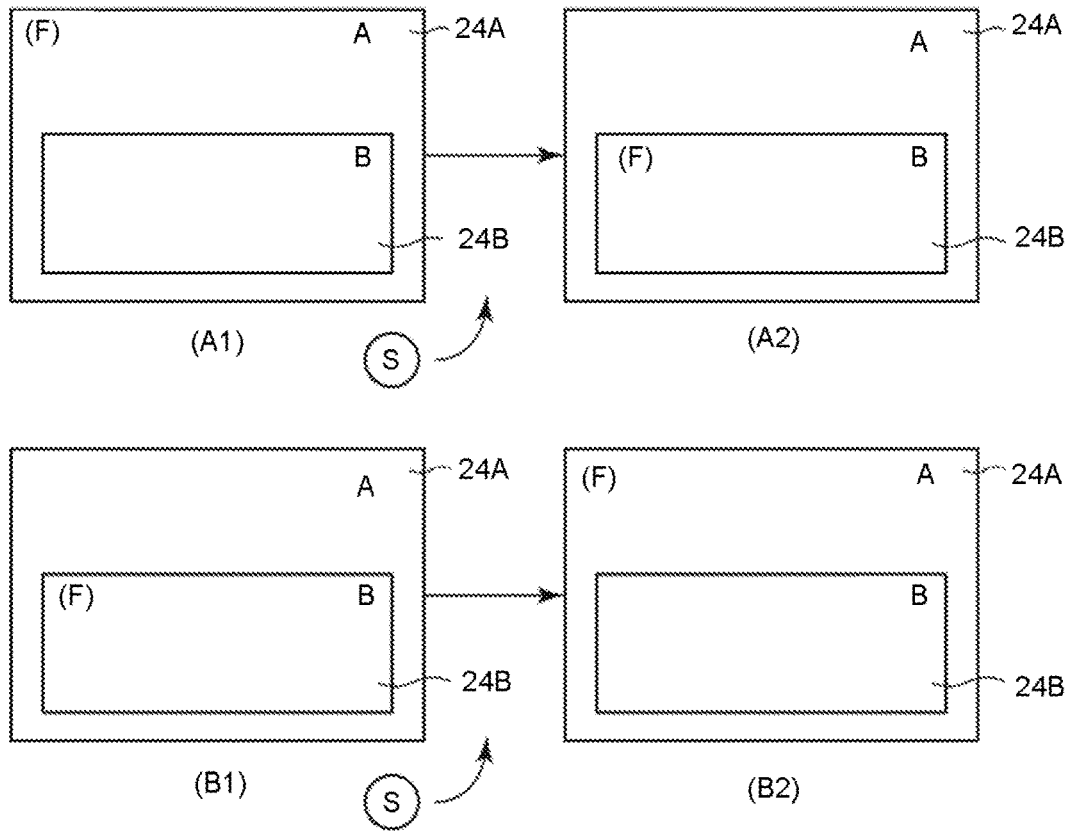
FIG. 7 is a diagram for explaining the focus switching process (2)

Next, with reference to a flowchart shown in FIG. 6, the focus switching process (2) when the gesture operation for switching the focus is the operation of changing the posture of the main body of the device is described. FIG. 7 is a diagram for explaining the focus switching process (2).

For example, if a predetermined shake gesture (operation of shaking the main body of the device) is detected as the gesture operation for switching the focus, the processor 21 searches to determine whether or not there is the parent content of the content on which the current focus is set.

If there is no parent content (No in ACT 21), the processor 21 switches the focus to, for example, the uppermost child content being displayed (ACT 24) if the child content is being displayed (Yes in ACT 23). Contrarily, if there is no child content being displayed (No in ACT 23), the processor 21 does not change the focus. On the other hand, if there is parent content (Yes in ACT 21), the processor 21 switches the focus to the parent content (ACT 22).

Specifically, as shown in FIG. 7(A1), in a state where the focus (F) is set on the content 24A, in a case in which the gesture operation (shake) for switching the focus is performed (S), if the content 24B is being displayed, the focus is switched to the content 24B, as shown in FIG. 7(A2).

On the other hand, as shown in FIG. 7(B1), when the focus (F) is set on the content 24B, in a case in which the gesture operation (shake) for switching the focus is performed (S), since the content 24B has the parent content, i.e., the content 24A, the focus is switched to the content 24A, as shown in FIG. 7(B2). Specifically, by performing the shake gesture operation for switching the focus, it is possible to alternately switch the focus to the contents in a parent-child relationship.

Figure 8:
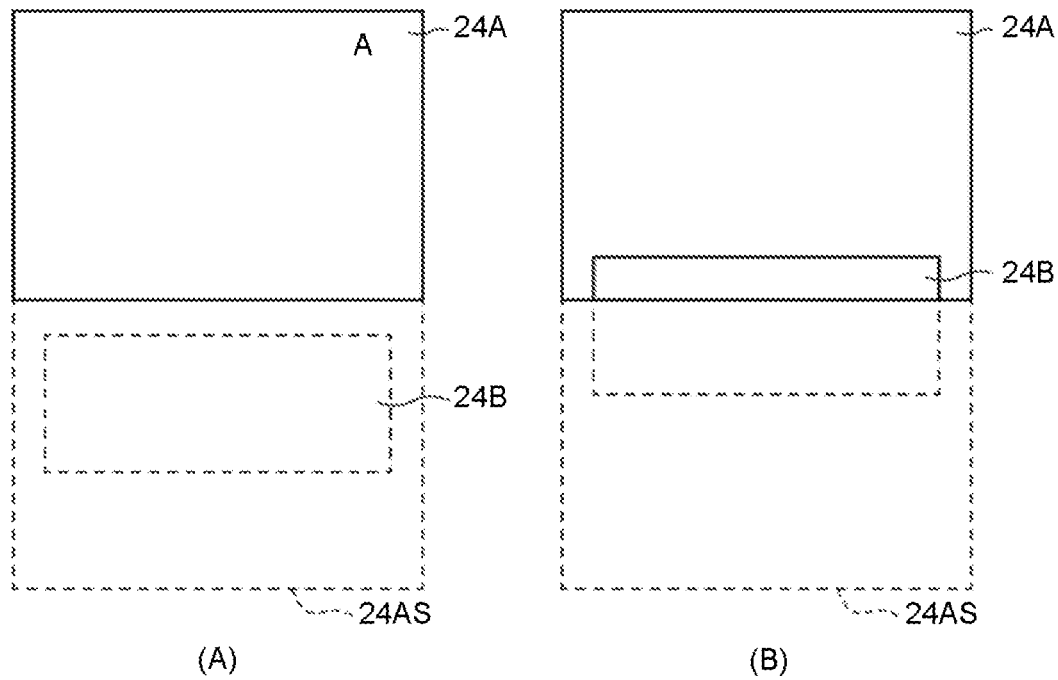
FIG. 8 is a diagram for explaining the focus switching process (2)

The state in which the child content is not being displayed means, for example, a state shown in FIG. 8(A). FIG. 8A shows a state in which the area for displaying the content 24B of the content 24A is included in a content 24AS which is beyond the display range by scrolling the content 24A.

As shown in FIG. 7(A1) and FIG. 7(A2), the state in which the child content is being displayed means not only the state in which the entire content 24B is displayed but also the state in which a part of the area for displaying the content 24B is displayed as shown in FIG. 8(B). Therefore, if the shake gesture for switching the focus is performed in the state in FIG. 8(B), the focus is switched to the content 24B. As shown in FIG. 7(A1) and FIG. 7(A2), the focus may be switched only when the entire content 24B is being displayed.

Figure 9:
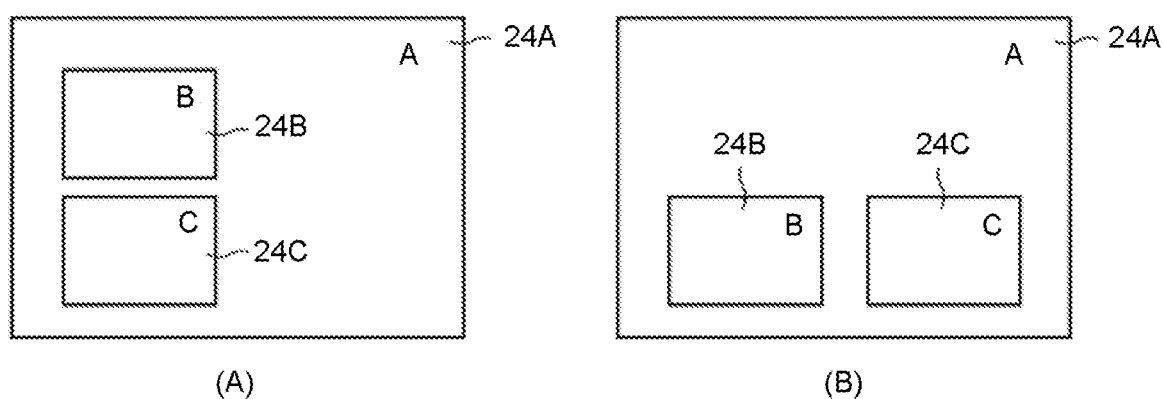
FIG. 9 is a diagram for explaining the focus switching process (2)

As shown in FIG. 9(A), for example, if a plurality of child contents (content 24B, content 24C) is set in the content 24A, for example, the focus is switched to the content 24B displayed at an upper side as the uppermost child content. If the content 24A is scrolled upwards, the content 24B is displayed beyond the display range, and the content 24C is displayed, the focus is switched to the content 24C.

Further, for example, as shown in FIG. 9(B), if the content 24B and the content 24C are arranged in a horizontal direction, the focus is set on the content 24B arranged on the leftmost side as the uppermost child content. It may be set in advance to switch the focus to the content 24C located at the rightmost side as the uppermost child content.

In this manner, it is possible to switch the focus through the gesture operation for changing the posture of the main body of the device. Therefore, after the focus is switched by the gesture operation, as described above, regardless of which one of the area for displaying the parent content (content 24A) and the areas for displaying child contents (contents 24B, 24C) the scrolling operation is performed on, it is possible to scroll the content on which the focus is set.

In the focus switching process (2) described above, although the gesture operation for switching the focus is a shake operation for shaking the main body of the device towards any direction or orientation, a shake operation towards a predetermined direction may be detected to switch the focus in response to the direction of the shake operation. For example, the focus may be switched in response to a shake operation for shaking one end (for example, an upper end) of the main body of the device towards a backward direction and an operation for shaking the other end (for example, a lower end) of the main body of the device towards a forward direction.

Figure 10:
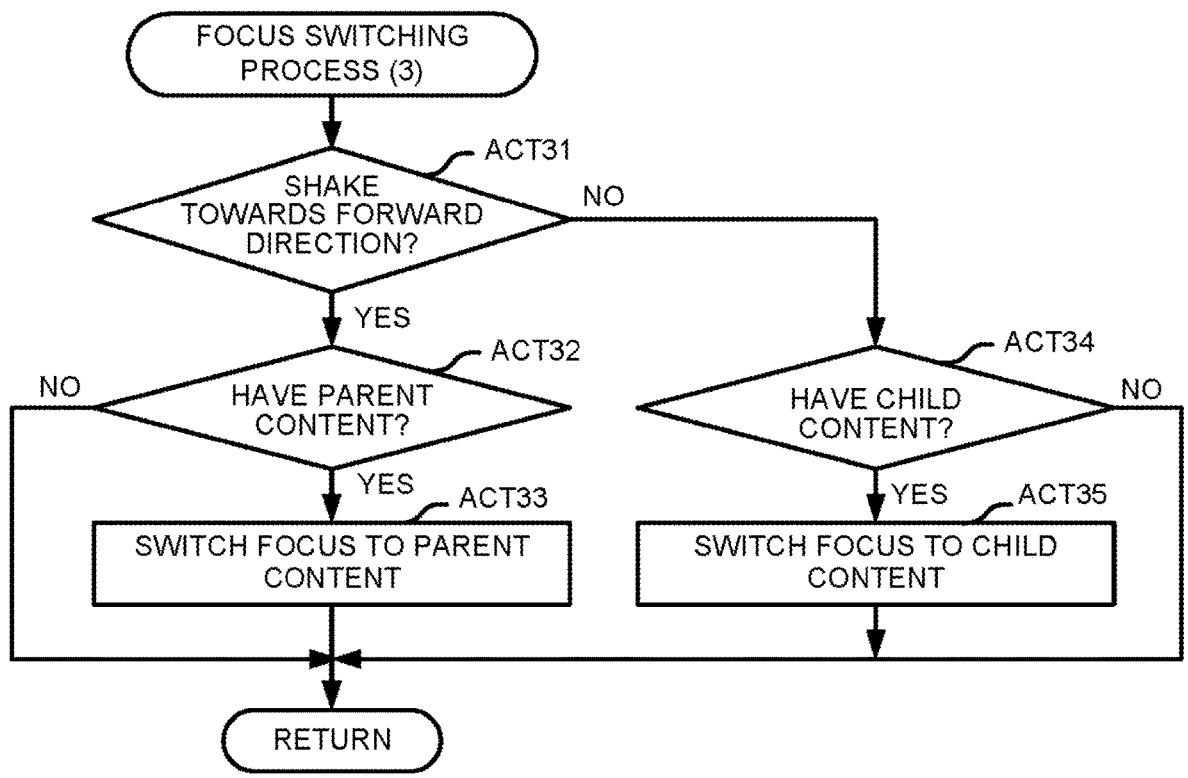
FIG. 10 is a flow chart depicting a focus switching process (3) according to some embodiments.
Figure 11:
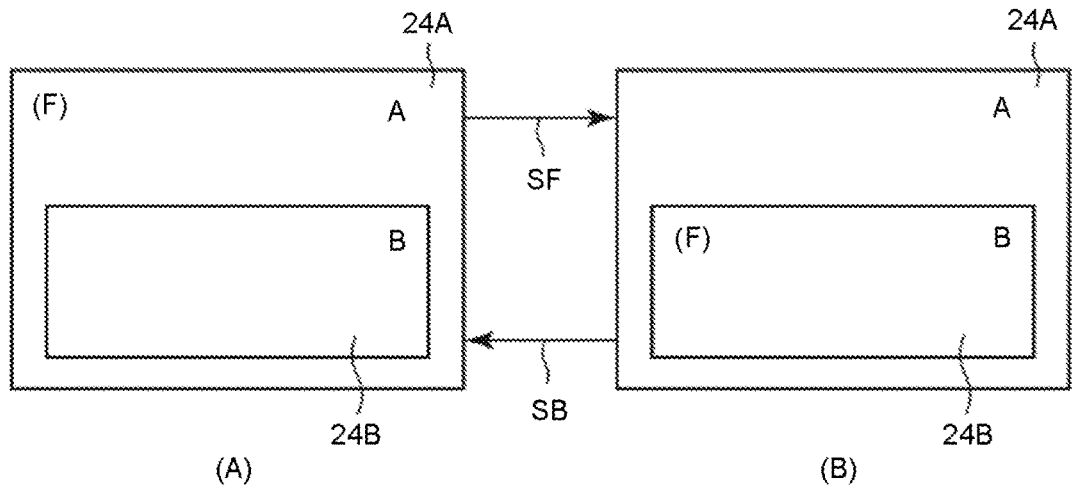
FIG. 11 is a diagram for explaining the focus switching process (3)

FIG. 10 is a flowchart of the focus switching process (3) for switching the focus in response to the direction of the shake operation, and FIG. 11 is a diagram for explaining the focus switching process (3).

For example, if a shake gesture operation (hereinafter, referred to as a forward shake gesture operation) for shaking the main body of the device towards the forward direction (shake to the lower end direction of the main body of the device) (Yes in ACT 31), the processor 21 searches to determine whether there is the parent content for the content on which the current focus is set. If there is the parent content (Yes in ACT 32), the processor 21 switches the focus to the parent content (ACT 33). On the other hand, if there is no parent content (No in ACT 32), the processor 21 does not switch the focus.

For example, if a shake gesture operation (hereinafter, referred to as a backward shake gesture operation) for shaking the main body of the device towards the backward direction (shake to the upper end direction of the main body of the device) (No in ACT 31), the processor 21 determines whether there is a child content being displayed for the content on which the focus is set. If there is the child content being displayed (Yes in ACT 34), the processor 21 switches the focus to the child content (ACT 35). On the other hand, if there is no child content (No in ACT 34), the processor 21 does not switch the focus.

Specifically, as shown in FIG. 11(A), if the backward shake gesture operation (SF) is performed in a state in which the focus is set on the content 24A, the focus is switched to the content 24B which is the child content, as shown in FIG. 11(B). In a state shown in FIG. 11(B), if the backward shake gesture operation (SF) is performed, the focus is not switched.

Further, as shown in FIG. 11(B), in a case in which the forward shake gesture operation (SB) is performed in the state in which the focus is set on the content 24B, the focus is switched to the content 24A which is the parent content, as shown in FIG. 11(A). In a state shown in FIG. 11(A), if the forward shake gesture operation (SB) is performed, the focus is not switched.

In this manner, the focus can be switched in response to different gesture operations (backward shake gesture operation, forward shake gesture operation) for switching the focus. Therefore, even if which content the current focus is set on is not grasped, the focus can be switched to the parent content or the child content by changing the gesture operation.

Figure 12:
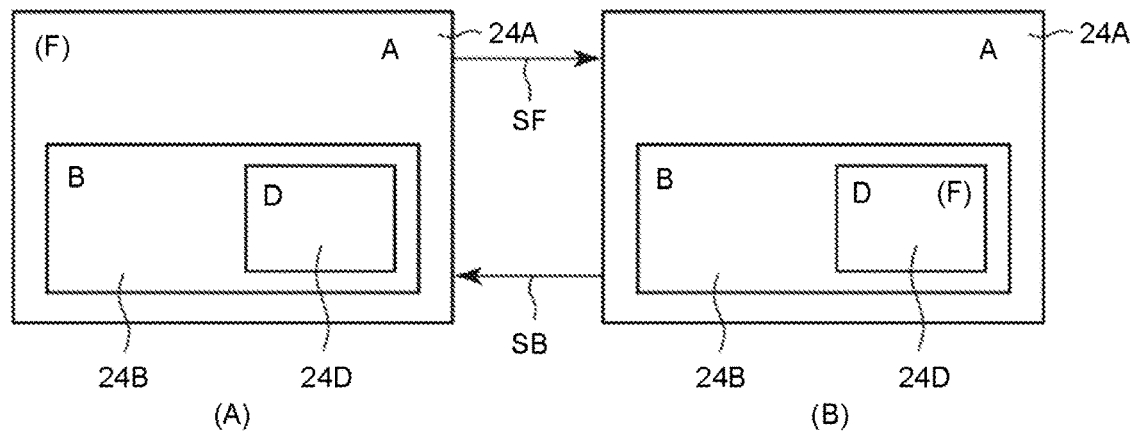
FIG. 12 is a diagram for explaining the focus switching process (3)

In the example shown in FIG. 11, an example is shown in which the content 24B which is one child content is provided in the area for displaying the content 24A as the parent content; however, as shown in FIG. 12, for example, a content 24D (grandchild content) which is a further subordinate content is provided in the area for displaying the content 24B. In such a case, the focus may be switched through gesture operations (backward shake gesture and forward shake gesture) between a superordinate content (parent content) and a subordinate content (grandchild content) without a directly nested relationship.

For example, as shown in FIG. 12(A), in a state in which the focus is set on the superordinate content 24A, if the backward shake gesture operation is performed, the focus is switched to the content 24D which is a further subordinate content instead of the content 24B in a directly nested relationship with the content 24A, as shown in FIG. 12(B). In a state shown in FIG. 12(B), if the backward shake gesture operation (SF) is performed, the focus is not switched.

Further, as shown in FIG. 12(B), if the forward shake gesture operation (SB) is performed in a state in which the focus is set on the subordinate content 24D, the focus is switched to the content 24A which is a further superordinate content instead of the content 24B in the directly nested relationship with the content 24A, as shown in FIG. 12(A). In the state shown in FIG. 12(A), if the forward shake gesture operation (SB) is performed, the focus is not switched.

In the above description, the focus is switched between the superordinate content (parent content) and the subordinate content (grandchild content) in a nested relationship of three hierarchies (parent, child and grandchild). In the electronic device 10 of some embodiments, in the case of contents having a nested relationship with four or more hierarchies, focus may be switched between arbitrary superordinate and subordinate content combinations.

Furthermore, in FIG. 12, while the case of contents provided in a nested manner in a superordinate and subordinate relationship is taken as an example, embodiments according to inventive concepts are applicable to a case in which a plurality of child contents are nested in one parent content, and the focus may be switched between plural child contents in response to the gesture operation. In this case, the focus may be switched to any one of the child contents corresponding to respective gesture operations in response to a gesture operation among the plurality of different gesture operations for switching the focus.

As described above, it is possible to switch the focus directly to any content corresponding to the gesture operation by different gesture operations. Therefore, even if a plurality of contents in a nested manner is provided, the focus can be switched to any content easily through the gesture operation.

Figure 13:
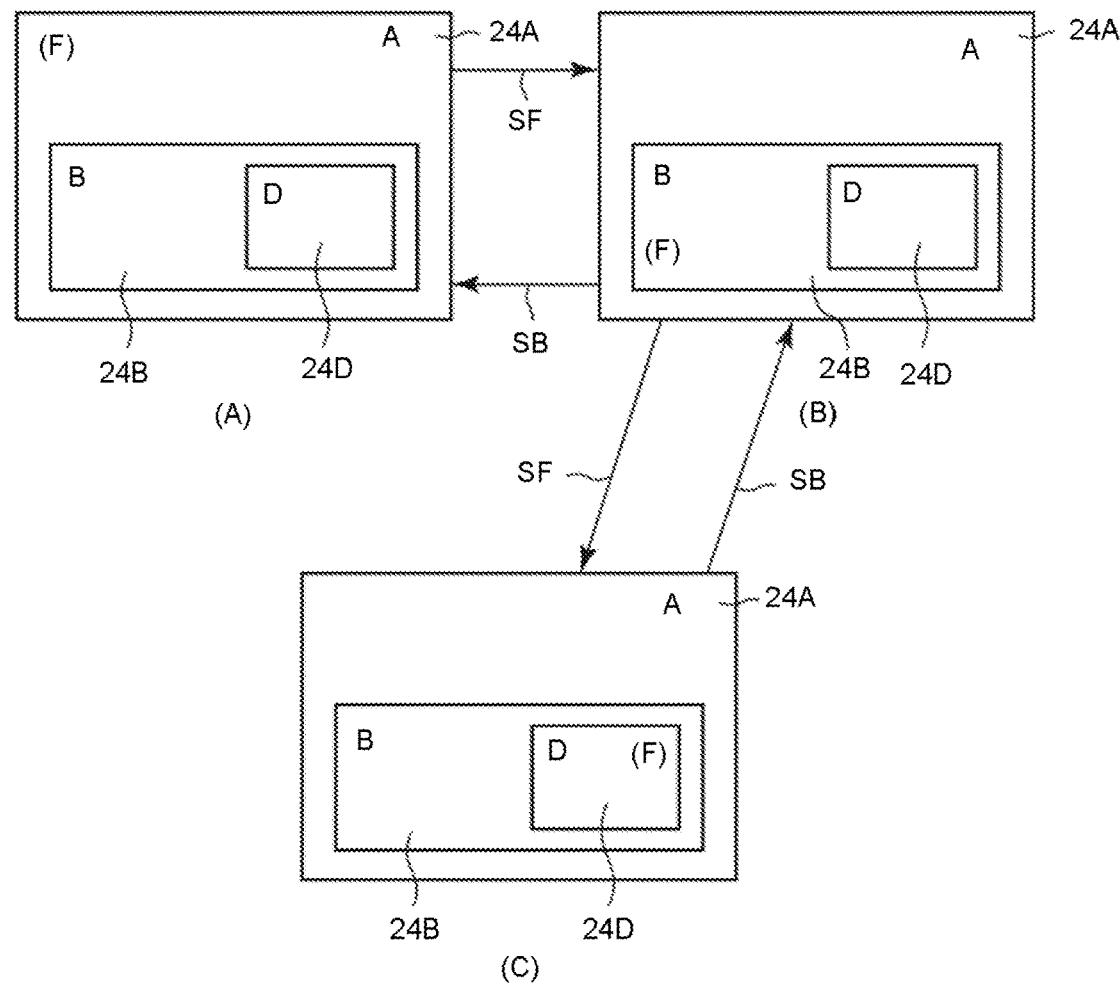
FIG. 13 is a diagram for explaining the focus switching process (3).

Furthermore, as shown in FIG. 13(A), FIG. 13(B), and FIG. 13(C), the focus may be switched in stages according to the gesture operation on contents in which a plurality of contents is nested hierarchically. For example, as shown in FIG. 13(A), in a case in which the backward shake gesture operation (SF) is performed in a state in which the focus is set on the uppermost content 24A, the focus is switched to the content 24B which is the subordinate content of the content 24A, as shown in FIG. 13(B). Furthermore, if the backward shake gesture operation (SF) is performed, the focus is switched to the lowest content 24D which is the subordinate content of the content 24B, as shown in FIG. 13(C).

Further, as shown in FIG. 13(C), if the forward shake gesture operation (SB) is performed in the state in which the focus is set on the lowest content 24D, the focus is switched to the content 24B which is the superordinate content of the content 24D, as shown in FIG. 13(B). Further, if the forward direction shake gesture operation (SB) is performed, as shown in FIG. 13(A), the focus is switched to the uppermost content 24A.

As described above, even if a plurality of contents is nested hierarchically, it is possible to sequentially switch the focus in a superordinate content direction or a subordinate content direction in response to the gesture operation for switching the focus. Therefore, it becomes easy to grasp which content the focus is switched to in accordance with the gesture operation, and the focus switching can be facilitated.

In the above description, the shake gesture operation is taken as an example of the gesture operation for switching the focus; however, as long as it is an operation, which is detectable by the sensor group 25, for changing the posture of the main body of the device, other gesture operations can also be used.

Any one of the above focus switching processes (1), (2) and (3) may be performed, or any combination thereof may be carried out.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

The programs for enabling a computer to execute the processes described in the above embodiment can be provided in any types of devices by being written in a recording medium such as a magnetic disk (a flexible disk, a hard disk, etc.), an optical disk (a CD-ROM, a DVD or the like), a semiconductor memory or the like. The programs may be provided in any types of devices by being transmitted via a communication medium. The computer reads the programs recorded on the recording medium or receives the programs via the communication medium and executes the programs to control operations to execute the above processes.

What is claimed is:

1. An electronic device, comprising:
    a display configured to:
        display contents in which a second area for displaying a second content is nested in a first area for displaying a first content; and
        display contents in which a third area for displaying a third content is nested in the first area for displaying the first content, and
    a processor including a focus setting module and a scrolling module,
        the focus setting module configured to:
            set, in accordance with a predetermined gesture operation, a focus on the first content in the first area or the second content in the second area; and
            set a focus on the first content, the second content, or the third content according to the predetermined gesture operation, and
        the scrolling module configured to:
            in response to a predetermined scrolling operation performed in a scrolling operation target area, to scroll the first content in the first area if the focus is set on the first content or the second content in the second area if the focus is set on the second content, regardless of whether the scrolling operation target area where the predetermined scrolling operation is performed is the first area or the second area; and
            scroll the first content, the second content, or the third content on which the focus is set according to the predetermined scrolling operation regardless of whether the scrolling operation target area is the first area, the second area, or the third area,
        wherein when the gesture operation indicates that the focus is to be set on the second area, and the second content is displayed beyond a display range, the focus setting module is configured to set the focus to the third area.

2. The electronic device according to claim 1, further comprising a touch panel, wherein
    the focus setting module is configured to detect the gesture operation based on an input operation on the touch panel.

3. The electronic device according to claim 2, wherein
    when the gesture operation on the second area for displaying the second content on which the focus is set is detected, the focus setting module is configured to set the focus on the first content; when the gesture operation on the first area for displaying the first content on which the focus is not set is detected, the focus setting module is configured to set the focus on the first content; and when the gesture operation on the second area for displaying the second content on which the focus is not set is detected, the focus setting module is configured to set the focus on the second content.

4. The electronic device according to claim 1, further comprising:
a sensor configured to detect a change in a posture of a main body of the device, wherein
the focus setting module is configured to detect the gesture operation based on a change in the posture of the main body of the device by the sensor.

5. The electronic device according to claim 4, wherein
in a state in which the focus is set on the second content, the focus setting module is configured to set the focus on the first content if the gesture operation is detected, and
in a state in which the focus is set on the first content, the focus setting module is configured to set the focus on the second content if the gesture operation is detected.

6. The electronic device according to claim 4, wherein
in a state in which the focus is set on the second content, the focus setting module is configured to set the focus on the first content when a first gesture operation is detected, and the focus setting module is configured to set the focus on the second content when a second gesture operation is detected, and
in a state in which the focus is set on the first content, the focus setting module is configured to set the focus on the second content when the second gesture operation is detected, and the focus setting module is configured to set the focus on the first content when the first gesture operation is detected.

7. An electronic device, comprising:
a display configured to:
display contents in which a second area for displaying a second content is nested in a first area for displaying a first content; and
display contents in which a third area for displaying a third content is nested in the second area for displaying the second content, and
a processor including a focus setting module and a scrolling module,
the focus setting module configured to:
set, in accordance with a predetermined gesture operation, a focus on the first content in the first area or the second content in the second area; and
set the focus on the first content, the second content, or the third content according to the predetermined gesture operation; and
the scrolling module configured to:
in response to a predetermined scrolling operation performed in a scrolling operation target area, scroll the first content in the first area if the focus is set on the first content or the second content in the second area if the focus is set on the second content, regardless of whether the scrolling operation target area where the predetermined scrolling operation is performed is the first area or the second area; and
scroll the first content, the second content, or the third content on which the focus is set according to the predetermined scrolling operation regardless of whether the scrolling operation target area is the first area, the second area, or the third area, wherein
in a state in which the focus is set on the first content, the focus setting module is configured to set the focus on the third content when a first gesture operation is detected, and the focus setting module is configured to set the focus on the first content when a second gesture operation is detected, and
in a state in which the focus is set on the third content, the focus setting module is configured to set the focus on the first content when the second gesture operation is detected, and the focus setting module is configured to set the focus on the third content when the first gesture operation is detected.

8. An electronic device, comprising:
a display configured to:
display contents in which a second area for displaying a second content is nested in a first area for displaying a first content; and
display contents in which a third area for displaying a third content is nested in the second area for displaying the second content, and
a processor including a focus setting module and a scrolling module,
the focus setting module configured to:
set, in accordance with a predetermined gesture operation, a focus on the first content in the first area or the second content in the second area; and
set the focus on the first content, the second content, or the third content according to the predetermined gesture operation; and
the scrolling module configured to:
in response to a predetermined scrolling operation performed in a scrolling operation target area, scroll the first content in the first area if the focus is set on the first content or the second content in the second area if the focus is set on the second content, regardless of whether the scrolling operation target area where the predetermined scrolling operation is performed is the first area or the second area; and
scroll the first content, the second content, or the third content on which the focus is set according to the predetermined scrolling operation regardless of whether the scrolling operation target area is the first area, the second area, or the third area, wherein
in a state in which the focus is set on the first content, the focus setting module is configured to set the focus on the second content when a first gesture operation is detected, and
in a state in which the focus is set on the second content, the focus setting module is configured to set the focus on the third content when the first gesture operation is detected.

9. The electronic device according to claim 8, wherein
in a state in which the focus is set on the third content, the focus setting module is configured to set the focus on the second content when a second gesture operation is detected, and
in a state in which the focus is set on the second content, the focus setting module is configured to set the focus on the first content when the second gesture operation is detected.

10. The electronic device according to claim 1, wherein the processor is configured to display the content which is focused to a specific color different from that of the content which is not focused.

11. A method for displaying contents, including:
displaying contents in which a second area for displaying a second content is nested in a first area for displaying a first content;

display contents in which a third area for displaying a third content is nested in the first area for displaying the first content;

setting a focus on the first content in the first area or the second content in the second area according to a predetermined gesture operation;

setting a focus on the first content, the second content, or the third content according to the predetermined gesture operation;

scrolling, in response to a predetermined scrolling operation performed in a scrolling operation target area, the first content in the first area if the focus is set on the first content or the second content in the second area if the focus is set on the second content regardless of whether the scrolling operation target area where the predetermined scrolling operation is performed is the first area or the second area;

scrolling the first content, the second content, or the third content on which the focus is set according to the predetermined scrolling operation regardless of whether the scrolling operation target area is the first area, the second area, or the third area; and setting the focus to the third area, when the gesture operation indicates that the focus is to be set on the second area, and the second content is displayed beyond a display range.

12. The method according to claim 11, further comprising detecting the gesture operation based on an input operation of a touch panel.

13. The method according to claim 12, wherein
when the gesture operation on the second area for displaying the second content on which the focus is set is detected, setting the focus on the first content; when the gesture operation on the first area for displaying the first content on which the focus is not set is detected, setting the focus on the first content; and when the gesture operation on the second area for displaying the second content on which the focus is not set is detected, setting the focus on the second content.

14. The method according to claim 11, further comprising detecting the gesture operation based on a detected change in a posture of a main body of an electronic device.

15. The method according to claim 14, wherein in a state in which the focus is set on the second content, setting the focus on the first content if the gesture operation is detected, and
in a state in which the focus is set on the first content, setting the focus on the second content if the gesture operation is detected.

16. The method according to claim 11, further comprising:
displaying contents in which the third area for displaying the third content is nested in the second area for displaying the second content,
setting the focus on the first content, the second content, or the third content according to the predetermined gesture operation; and
scrolling the first content, the second content, or the third content on which the focus is set according to the predetermined scrolling operation regardless of whether the scrolling operation target area is the first area, the second area, or the third area.

* * * * *